(12) United States Patent
Hsu

(10) Patent No.: US 8,246,062 B2
(45) Date of Patent: Aug. 21, 2012

(54) FAST DISPLACEABLE BICYCLE FENDER PLATE STRUCTURE

(75) Inventor: Kuo Chung Hsu, Changhua (TW)

(73) Assignee: Sunnywheel Industrial Co., Ltd., Changhua (TW)

( * ) Notice: Subject to any disclaimer, the term of this patent is extended or adjusted under 35 U.S.C. 154(b) by 414 days.

(21) Appl. No.: 12/385,904

(22) Filed: Apr. 23, 2009

(65) Prior Publication Data

US 2010/0270770 A1 Oct. 28, 2010

(51) Int. Cl.
*B62D 25/18* (2006.01)

(52) U.S. Cl. ............ 280/152.1; 280/152.3; 280/152.2

(58) Field of Classification Search ............ 280/152.1, 280/152.2, 152.3, 281.1, 852
See application file for complete search history.

(56) References Cited

U.S. PATENT DOCUMENTS

| | | | | | |
|---|---|---|---|---|---|
| 5,112,071 | A | * | 5/1992 | Jones | 280/152.3 |
| 5,121,935 | A | * | 6/1992 | Mathieu et al. | 280/152.3 |
| 5,716,070 | A | * | 2/1998 | Pearson | 280/852 |
| 5,954,354 | A | * | 9/1999 | Chung | 280/152.1 |
| 5,961,136 | A | * | 10/1999 | Tseng | 280/152.3 |
| 6,199,883 | B1 | * | 3/2001 | Gable | 280/152.1 |
| 6,913,274 | B2 | * | 7/2005 | Hsu | 280/152.1 |
| 7,431,316 | B2 | * | 10/2008 | Chuang | 280/152.3 |
| 2008/0277899 | A1 | * | 11/2008 | Hsu | 280/281.1 |
| 2010/0140896 | A1 | * | 6/2010 | McHale | 280/152.3 |
| 2010/0207374 | A1 | * | 8/2010 | Kuo-Chung | 280/852 |

* cited by examiner

*Primary Examiner* — Hau Phan
(74) *Attorney, Agent, or Firm* — Rosenberg, Klein & Lee

(57) ABSTRACT

A fast displaceable bicycle fender plate structure includes at least a hitch and a fender plate. The hitch has a body and a coupler formed on the body to fasten a fender to a bicycle frame. The hitch further has a plate fastener which has at least one first fastening element located thereon. The fender plate has at least one second fastening element corresponding and fastenable to the first fastening element so that the fender plate can be quickly installed or removed by users without using any tool.

5 Claims, 7 Drawing Sheets

FAST DISPLACEABLE BICYCLE FENDER PLATE STRUCTURE

BACKGROUND OF THE INVENTION

1. Field of the Invention

The present invention relates to a fast displaceable bicycle fender plate structure and particularly to a bicycle fender plate structure that has a fender plate removable and displaceable by users quickly without using tools.

2. Description of the Prior Art

A conventional bicycle fender 9 (referring to FIG. 1) mainly includes a plate 90 and a coupler 91 at the front end of the plate 90 to be fastened to a bicycle frame. When users are tired of its style and color and want to make replacement they have to rely on tools to do the change. Trying to do replacement with bare hands and without tools is difficult. The work of doing replacement also takes time.

SUMMARY OF THE INVENTION

In view of the aforesaid problems, the present invention aims to provide a fast replaceable bicycle fender plate structure for a fender which has at least a hitch and a fender plate.

The hitch has a coupler to fasten the fender to a bicycle frame, and a plate fastener which has at least one first fastening element.

The fender plate has at least one second fastening element corresponding to the first fastening element.

The first fastening element can be coupled with the second fastening element to facilitate removing and installation of the fender plate without relying on any tools.

The fender plate according to the invention is a plate extendable in a flat condition and has at least one pre-set folding line. Through the second fastening element formed thereon corresponding to the first fastening element, the flat plate can be folded about the folding line to become cubical to mate a pre-set fastening angle formed on the plate fastener so that the pliable plate can be braced by the plate fastener to become sturdier. It is also convenient to stow and carry when not in use, and easy to assemble and install quickly when in use.

In one aspect the first fastening element is a male latch while the second fastening element corresponding to the first fastening element is a female latch.

In another aspect the first fastening element is a female latch while the second fastening element corresponding to the first fastening element is a male latch.

In yet another aspect the first and second fastening elements can be coupled in an assembly that also can be separated as desired, such as a pair of male and female latches, Velcro bands, double-sided adhesive tapes and the like. Moreover, the first fastening element may also be a strut with an inverse hook (or aperture) while the second fastening element an aperture (or strut with an inverse hook) to form a couplable assembly to become another type of simple embodiment.

In yet another aspect the hitch includes a body and a plate fastener formed in an integrated manner.

In yet another aspect the plate fastener further includes a first arm and a second arm corresponding to each other. The first fastening element is located on the first arm and the second arm corresponding to the second fastening element located on two sides of the fender plate to form coupling. Such a structure can support the fender plate in a desired shape and also bear its weight.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
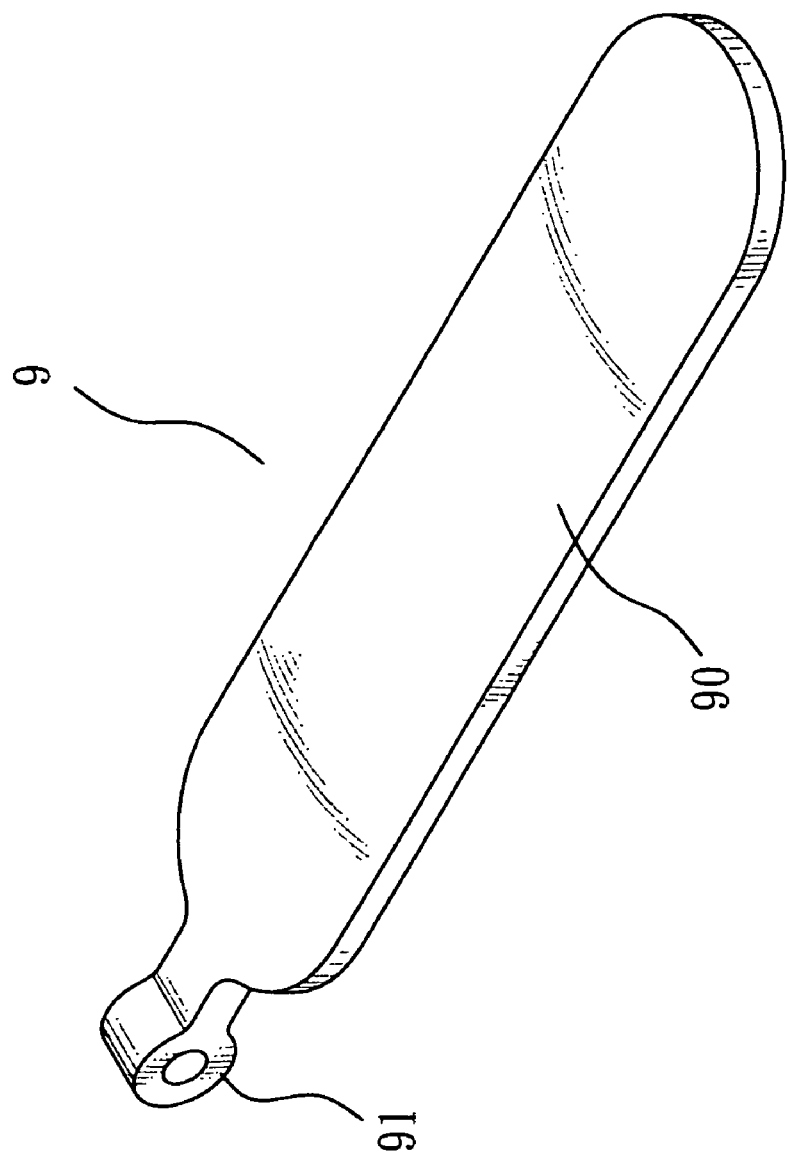
FIG. 1 is a schematic view of a conventional fender.
Figure 2:
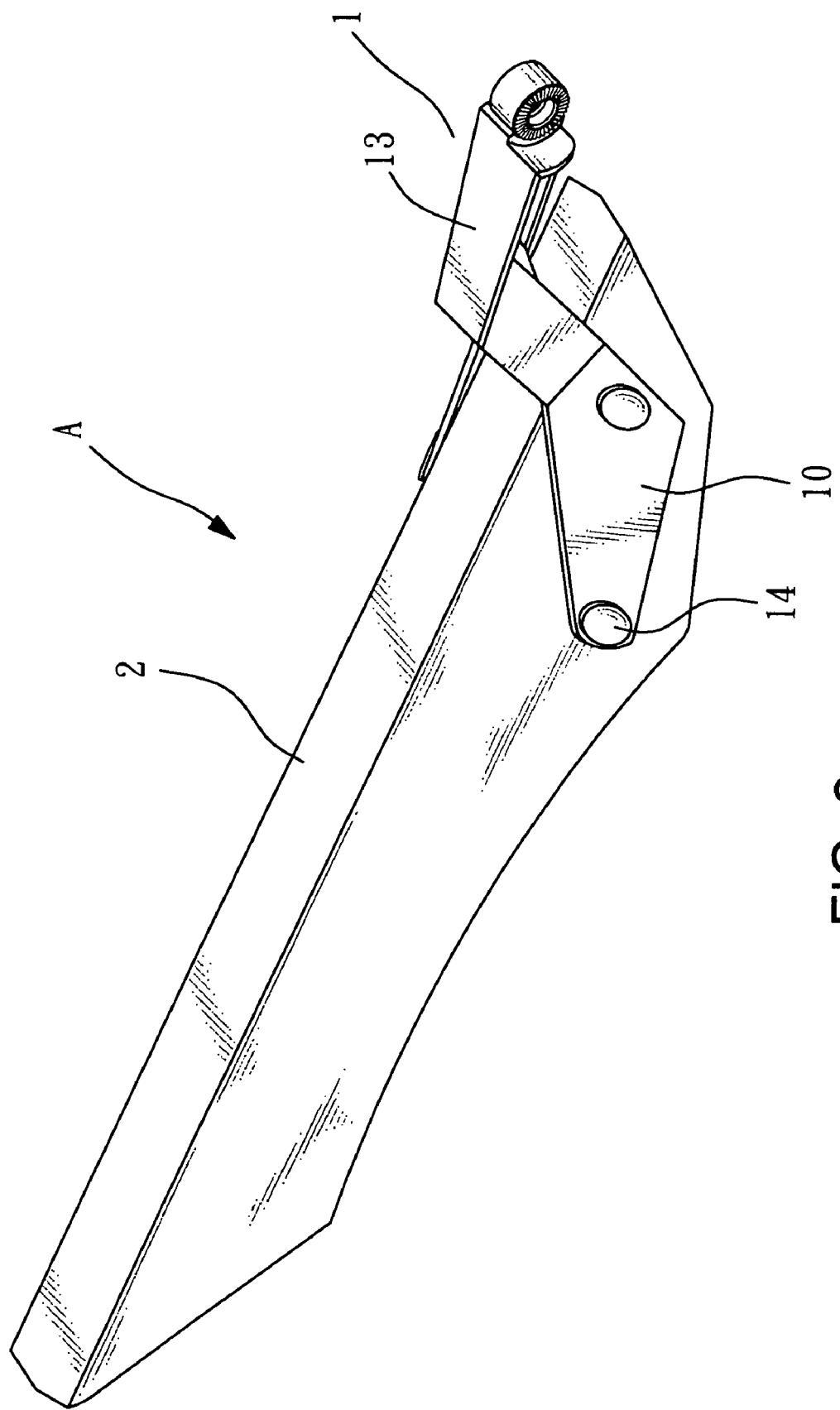
FIG. 2 is a perspective view of an embodiment of the invention.
Figure 3:
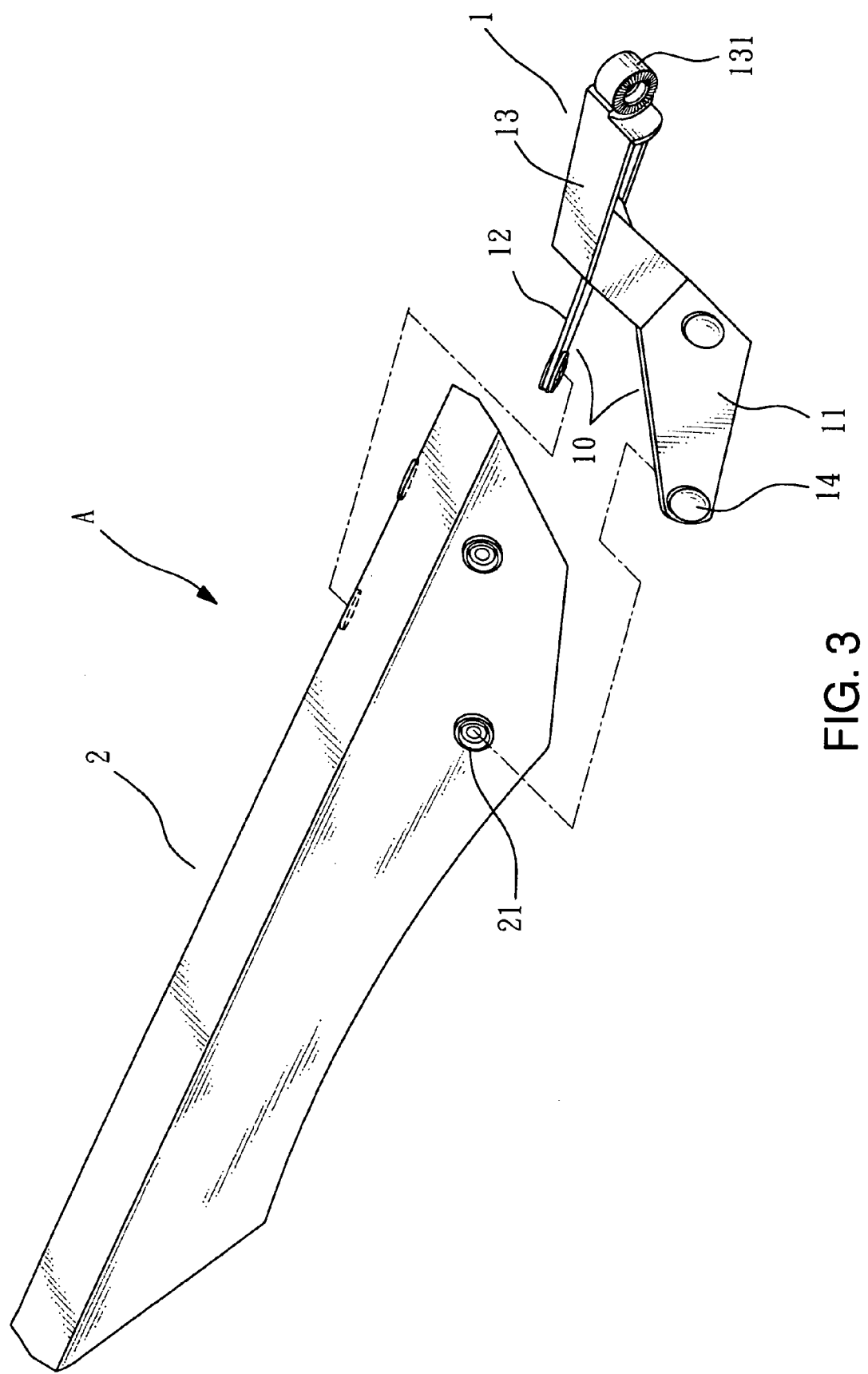
FIG. 3 is an exploded view of an embodiment of the invention.

Please referring to FIGS. 2 and 3, the present invention provides a fast displaceable bicycle fender plate structure installable on a fender A which has at least a hitch 1 and a fender plate 2.

The hitch 1 has a body 13 with a coupler 131 formed thereon to fasten the fender A to a bicycle frame (not shown in the drawings). The hitch 1 further has a plate fastener 10 which has at least one first fastening element 14.

The fender plate 2 includes a plate 20 which has at least one second fastening element 21 corresponding to the first fastening element 14 to form coupling therewith to fasten the fender plate 2 to the hitch 1.

Referring to FIG. 3, the body 13 and the plate fastener 10 may be formed in an integrated manner. The plate fastener 10 further has a first arm 11 and a second arm 12 that have at least one first fastening element 14 to mate and fasten to the second fastening element 21.

Figure 4:
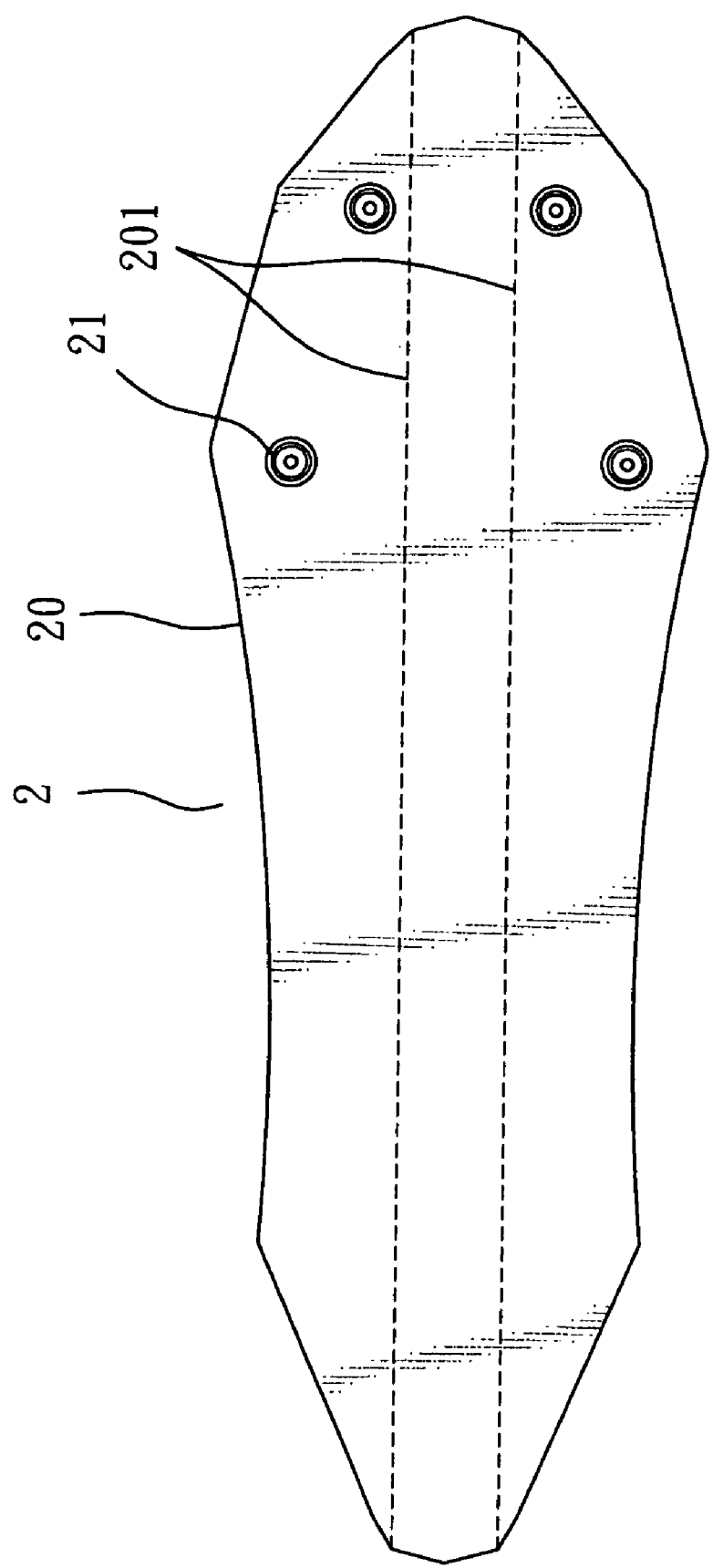
FIG. 4 is a plane view of the fender plate extended in a flat condition before assembly.

The plate 20 of the fender plate 2 is extendable in a flat condition (referring to FIG. 4). The plate 20 has at least one pre-set folding line 201. The fender plate 2 has at least one second fastening element 21 mating and fastenable to the first fastening element 14. By means of such a coupling structure the flat plate 20 can mate the profile and assembly angle of the first and second arms 11 and 12 along the folding line 201 to become a cubical plate 20 so that the original pliable plate 20 can be supported by the plate fastener 10 to become sturdier. When the fender plate 2 is not in use, it is easier to stow and carry. When in use it can be assembled and installed quickly.

Figure 5:
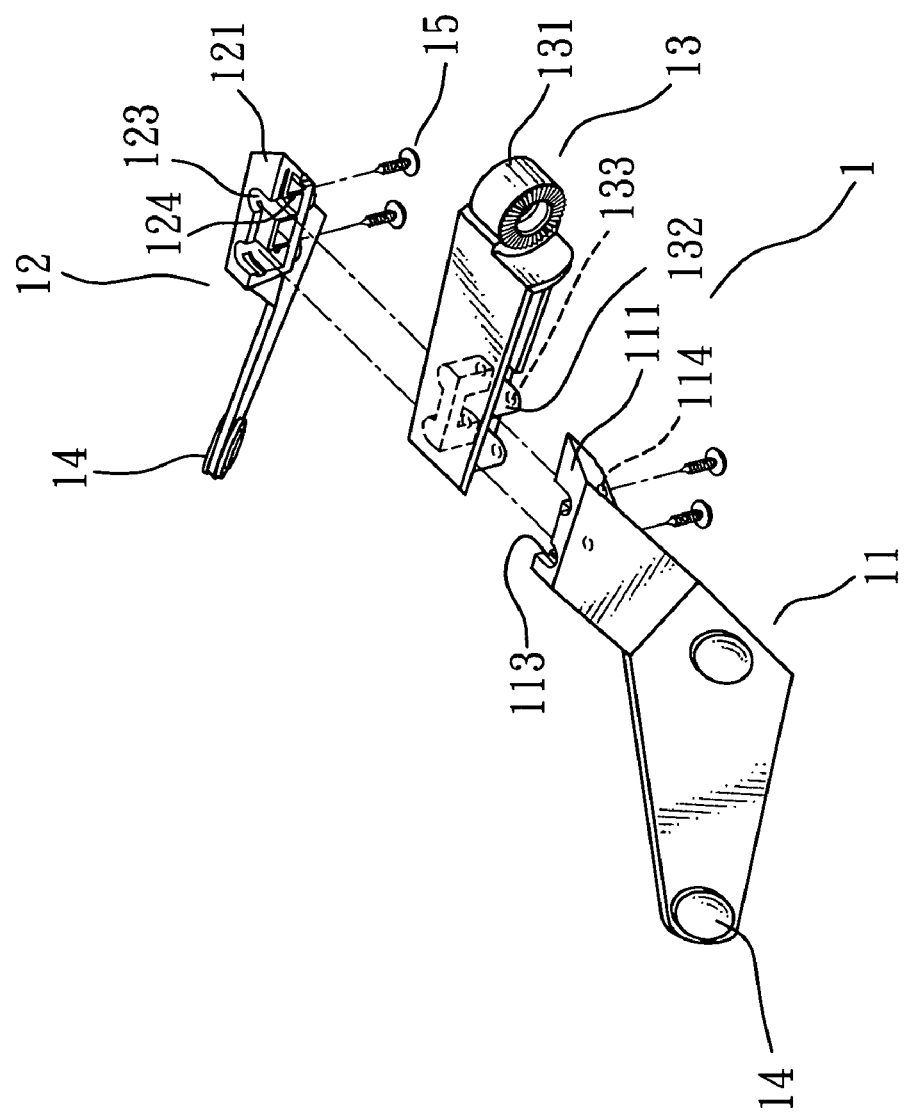
FIG. 5 is a schematic view of another embodiment of the hitch of the invention.

Refer to FIG. 5 for another embodiment of the plate fastener 10. It includes a body 13 and a plate fastener 10 which has a first arm 11 and a second arm 12. All the aforesaid elements are independent and separated, and can be assembled to form a hitch 1.

The body 13 has a coupler 131 at one end and a strut 132 at another end. The strut 132 has at least one fastening hole 133.

The first arm 11 and second arm 12 of the plate fastener 10 have respectively a coupling portion 111 and 121 that have at least one notch 113 and 123 to form latching with the strut 132. The notches 113 and 123 have respectively an aperture 114 and 124 at the bottom to be run through by at least one screw 15 to engage with the fastening hole 133. The first arm 11 and the second arm 12 have a plurality of first fastening elements 14 formed thereon.

Figure 6:
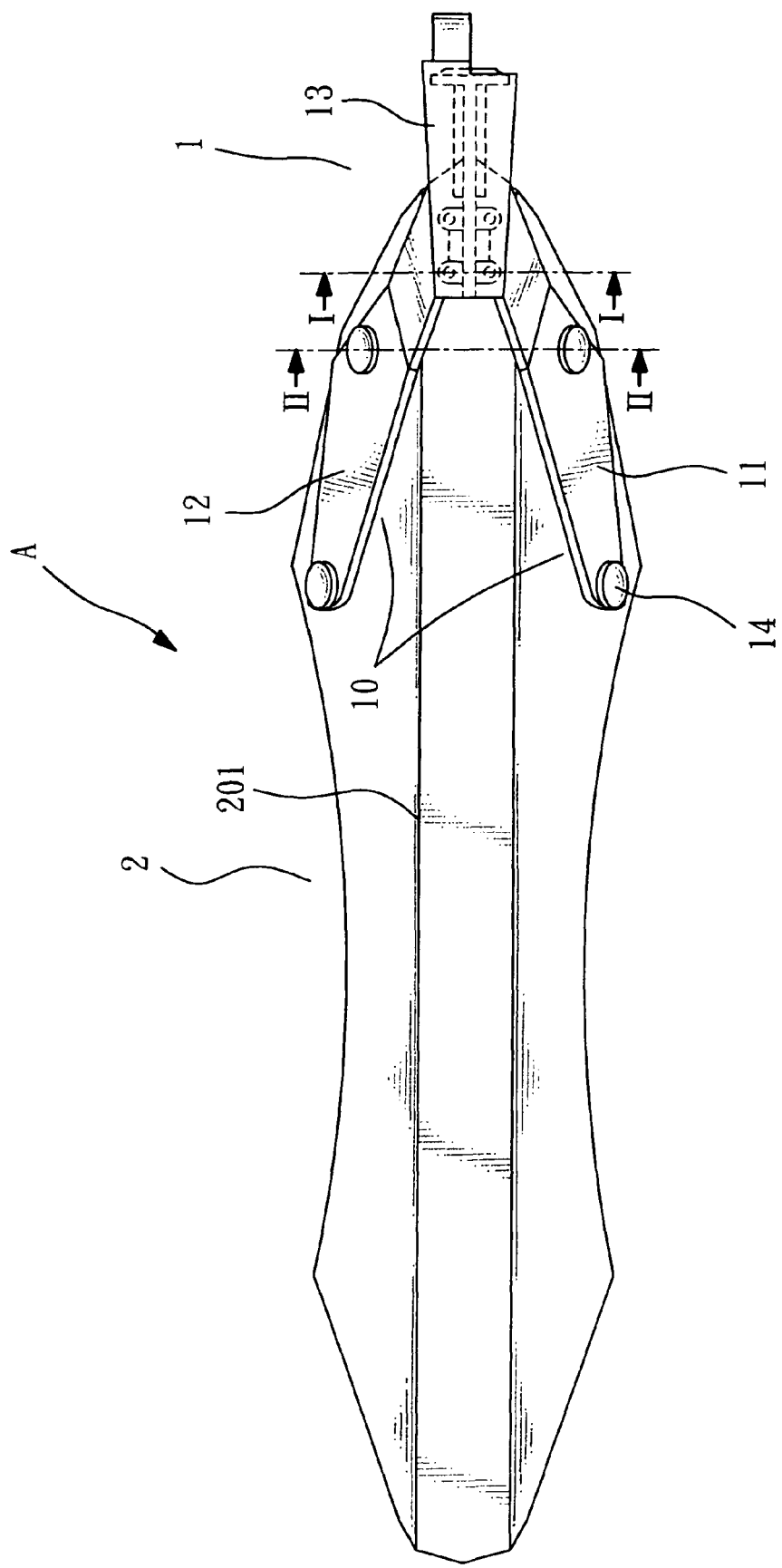
FIG. 6 is a schematic view of an embodiment of the invention.
Figure 7:
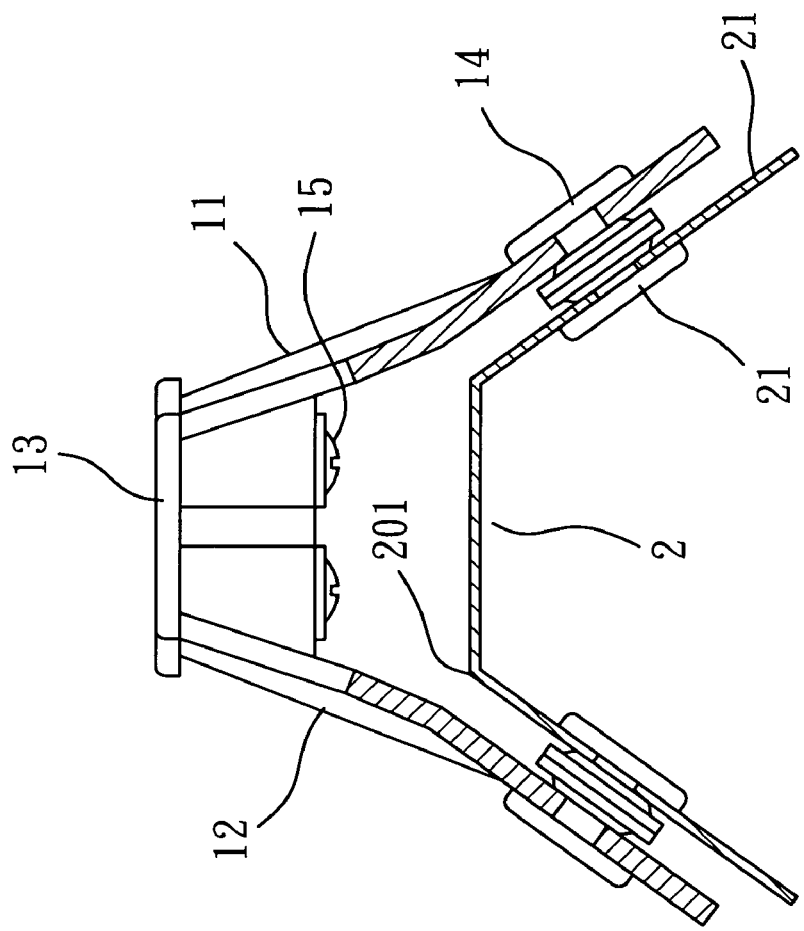
FIG. 7 is a cross section taken on line I-I in FIG. 6.
Figure 8:
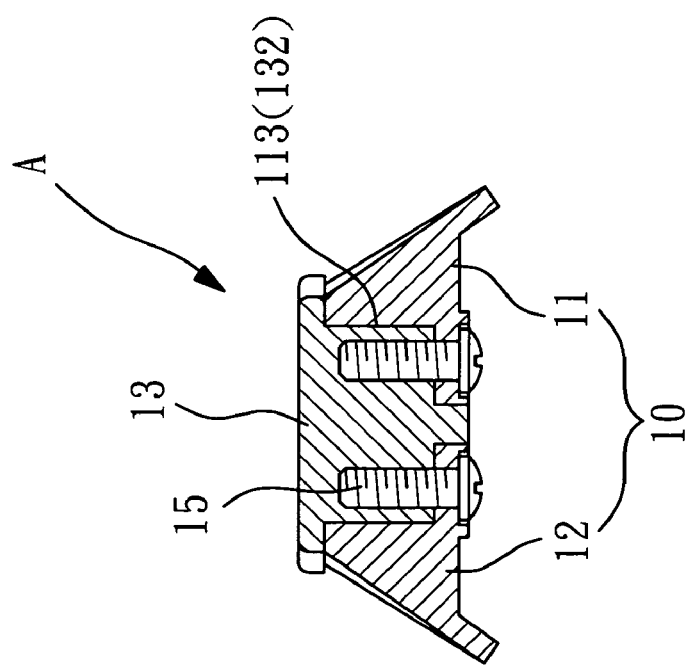
FIG. 8 is a cross section taken on line II-II in FIG. 6.

Through the elements set fort above (referring to FIGS. 6 through 8), when to remove the fender plate 2 is desired, the second fastening element 21 of the fender plate 2 can be separated from the first fastening element 14 without using any tool. For assembly, couple the first fastening element 14 and the second fastening element 21 together, then the fender A can be installed without relying on any tool.

In one aspect the first fastening element 14 is a male latch while the second fastening element 21 is a female latch mating the first fastening element 14.

In another aspect the first fastening element 14 is a female latch while the second fastening element 21 is a male latch mating the first fastening element 14.

As a conclusion, the fender plate structure of the invention provides improved features and can overcome the shortcomings of the conventional fenders.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

I claim:

1. A fender having a fast displaceable bicycle fender plate structure comprising:
   at least one hitch including a body extending from a coupler formed on a first end thereof for attachment by a fastener to a bicycle frame, the body having a plate fastener extending from a second end thereof, the plate fastener being formed by a pair of arms extending divergently from the body;
   the fender plate having a pair of sides extending divergently for a pair of longitudinally directed fold lines and being detachably coupled to the hitch;
   a plurality of first fastening elements disposed on said pair of arms of the plate fastener; and
   a plurality of second fastening elements disposed on the pair of sides of the fender plate and respectively located to be in correspondence with the plurality of first fastening elements, the plurality of second fastening elements being complementary to the plurality of first fastening elements and removably coupleable thereto without a need for tools for ease of securing the fender plate to the hitch and ease of removal therefrom.

2. The fender having a fast displaceable bicycle fender plate structure of claim 1, wherein the first fastening element is a male latch and the corresponding second fastening element is a female latch.

3. The fender having a fast displaceable bicycle fender plate structure of claim 1, wherein the first fastening element is a female latch and the corresponding second fastening element is a male latch.

4. The fender having a fast displaceable bicycle fender plate structure of claim 1, wherein the fender plate is extendable in a flat condition when removed from securement to the hitch, the pair of sides of the fender plate being foldable about the pair of longitudinally directed fold lines to and from the flat condition.

5. The fender having a fast displaceable bicycle fender plate structure of claim 1, wherein the first and second fastening elements are complementary hook and loop type fasteners.

* * * * *